United States Patent [19]

Johnson et al.

[11] Patent Number: 5,288,107
[45] Date of Patent: Feb. 22, 1994

[54] MULTIPLE INFORMATION FIELD LABEL

[75] Inventors: Mack E. Johnson, Arvada; Daniel A. Benade, Lakewood; Edward S. Folga, Sedalia, all of Colo.

[73] Assignee: Engineered Data Products, Inc., Broomfield, Colo.

[21] Appl. No.: 10,220

[22] Filed: Jan. 27, 1993

[51] Int. Cl.⁵ .............................................. B42D 15/00
[52] U.S. Cl. ...................................... 283/81; 283/36; 283/37; 283/41; 283/114
[58] Field of Search .................... 283/36, 37, 41, 81, 283/114, 117

[56] References Cited

U.S. PATENT DOCUMENTS

| | | | |
|---|---|---|---|
| 4,204,639 | 5/1980 | Barber et al. | 235/462 |
| 4,544,182 | 10/1985 | Spring | 283/81 |
| 4,889,982 | 12/1989 | Young et al. | 235/494 |
| 4,939,674 | 7/1990 | Price et al. | 364/523 |
| 5,083,816 | 1/1992 | Folga et al. | 283/81 |
| 5,197,764 | 3/1993 | Hicinbothem et al. | 283/81 |

Primary Examiner—Paul A. Bell
Attorney, Agent, or Firm—Glenn L. Webb

[57] ABSTRACT

The present invention provides a label having multiple information fields. The label includes two substantially parallel vertical columns. Each of the vertical columns is divided into at least two cells. The upper and lower cells of the first vertical column each have several blocks of optical character recognition alphanumeric characters to identify unique information in regard to the information to be stored in the media, the media, the label itself or the site in which the media is to be stored. The characters and/or the cell background can be color-coded to provide additional information. The lower cell of the second vertical column includes a single block having a string of alphanumeric characters with a color-coded background to correlate to the latter two characters of the string. This information is provided to identify the storage site of the media. The upper cell of the second vertical column includes a machine-readable indicia, such as a bar code. The information in the machine-readable indicia correlates to all or part of the information of the other three information fields.

20 Claims, 1 Drawing Sheet

U.S. Patent  Feb. 22, 1994  5,288,107
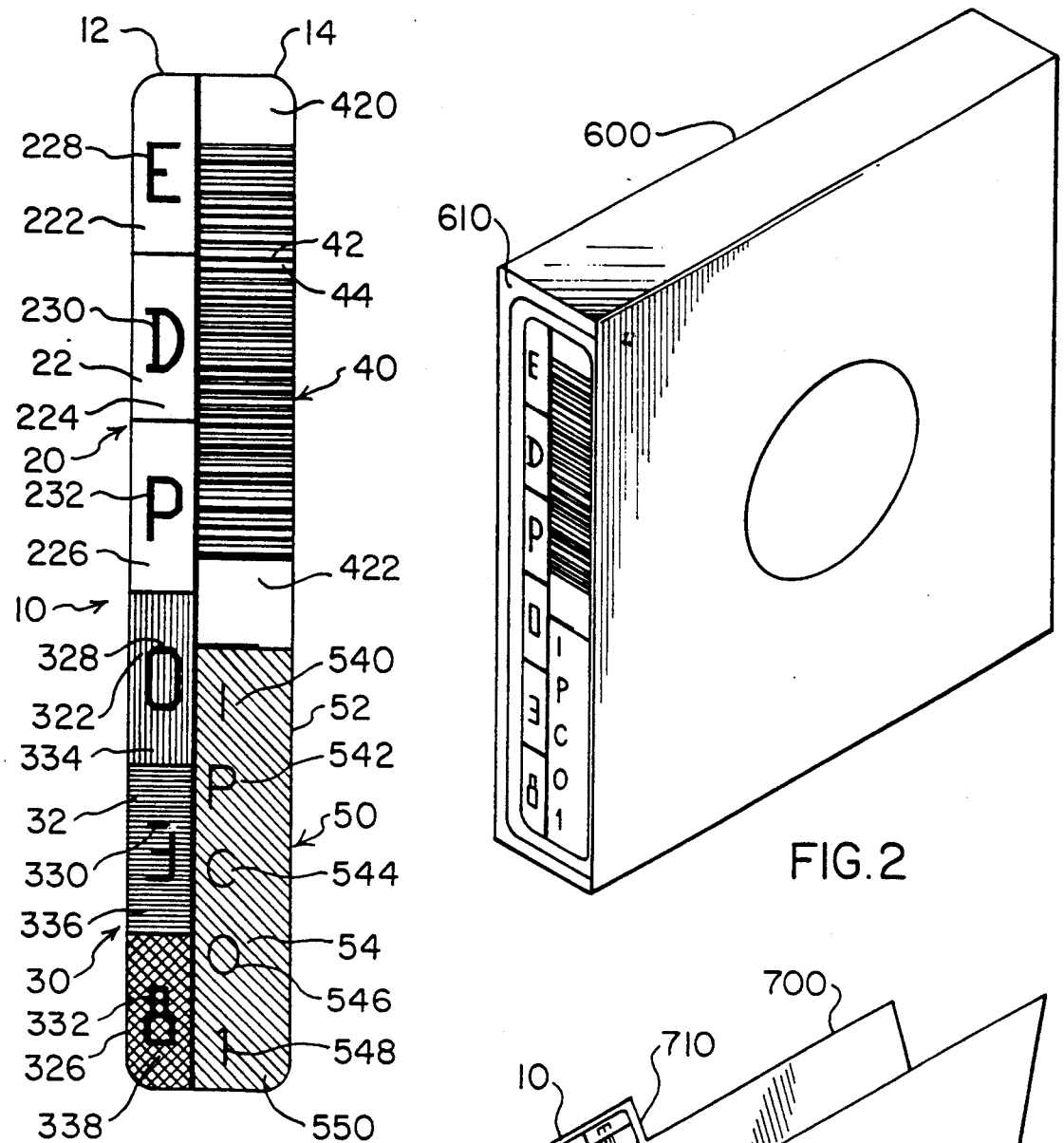
FIG. 1
FIG. 2
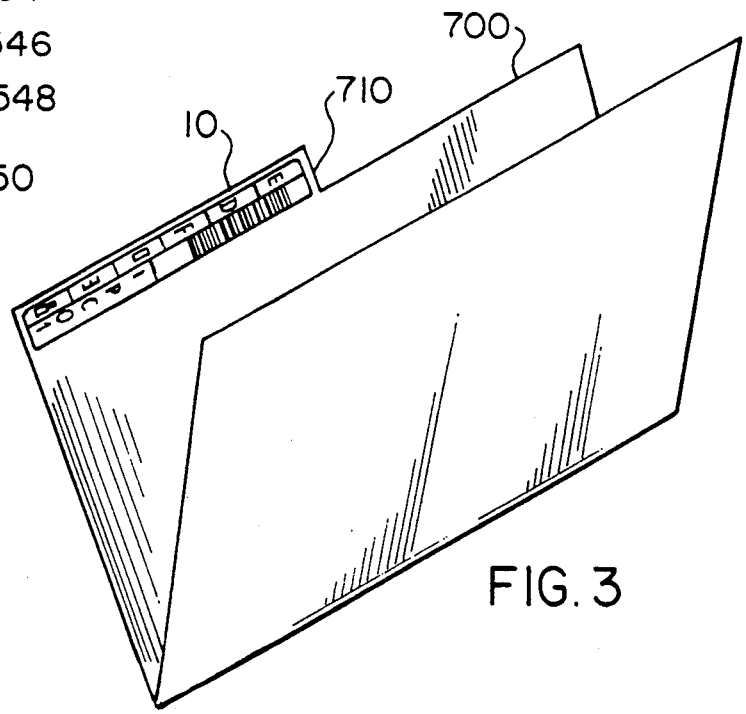
FIG. 3

MULTIPLE INFORMATION FIELD LABEL

BACKGROUND OF THE INVENTION

1. Field of the Invention

This invention relates to the field of labels, and particularly to the field of labels having multiple information fields for machine and human readable indicia.

2. Statement of the Problem

Information of all types is frequently stored in storage media ranging from file folders to magnetic tape cartridges. One of the problems with information storage media is the identification and tracking of these media. This becomes a critical problem in large information processing sites. These sites range from central libraries for file folders to automated robotic computer library systems having multiple sites.

Labels are often used to identify information media whether these information media are in the form of file folders or magnetic tape cartridges. These labels include individually applied labels for each digit of the media identification, machine-readable coded labels, and labels containing combinations of machine readable codes, optical character recognition codes and human readable codes.

The former style of label are disclosed in U.S. Pat. No. 4,544,182, issued to Spring. This label includes a color-coding information field separate from an alphanumeric field. The label uses perforated sections for separating unwanted portions of the label.

Examples of the latter style of label are disclosed in U.S. Pat. No. 4,204,639, U.S. Pat. No. 4,844,508, U.S. Pat. No. 4,889,982 and U.S Pat. No. 5,083,816. These labels are intended for use in automated cartridge library systems. The labels include at least one information field which contains a machine readable code and one information field having an optical character recognition code which is also human readable.

U.S. Pat. No. 4,204,639, issued to Barber et al. discloses a label having a colored field with an alphanumeric character. A machine readable marking is included. Each digit must be individually applied to a file.

U.S. Pat. No. 4,889,982, issued to Young et al. also discloses a label for magnetic tape cartridges in similar library systems. This label further includes color coding the background of the alphanumeric characters of the optical character recognition code. This provides a third method of identifying the information on the label.

U.S. Pat. No. 4,939,674, issued to Price et al. discloses the process for producing labels discussed above.

U.S. Pat. No. 5,083,816, issued to Folga et al. prior to one year of the filing of this application and commonly-owned with this application, discloses a label for use in automated library systems. This label includes an information field having machine readable codes, and a color-coded alphanumeric information field separated into two separate columns having different sizes of characters.

The prior art labels are limited to providing a single piece of information in two different formats. Additional information is sometimes needed beyond the capacity of the prior art labels. For instance, additional identification fields, particularly human-readable informational fields, are useful to improve the accessibility of the data files.

An additional problem is the lack of ease in reading the information from the label. The format of prior labels does not readily provide distinguishing characteristics of the label, the media or the location site.

Another problem which is not addressed by the prior art labels is the ability to identify the storage site in which the data file is to be located. For instance, large information processing systems may use a number of different library sites. None of the prior art labels is able to uniquely identify the site in which a particular data file is destined.

Additional problems arise in the change in style of sites and labels. Some labels may be used for one style of storage site while other labels may be used for another style of site. None of the prior art labels readily identifies the type of label attached to a data file. These labels require the operator or operating system to identify the label by visually recognizing the style by the label format.

None of the prior art labels are able to provide sufficient information fields to enhance the efficiency of the data storage media library systems.

Thus, a problem exists in the inability of prior labels to provide additional information fields.

SUMMARY OF THE INVENTION

The present invention solves the problem of the prior labels by providing a label having multiple information fields. In one preferred embodiment, the label provides information fields for identifying the type of label, the information stored in the data storage media, the site in which the data storage media is to be located and machine-readable characters correlating to the combination of the other information fields for tracking the data storage media.

In one preferred embodiment, the label includes multiple information fields. The label is formed from a base material having an adhesive back. The label includes two substantially parallel vertical columns. Each of the vertical columns is divided into at least two cells.

The first cell of the first vertical column has several blocks of optical character recognition alphanumeric characters. These characters identify unique information in regard to the information to be stored in the media, the media, the label itself or the site in which the media is to be stored. The characters and/or the cell background can be color-coded to provide additional information.

The second cell of the first vertical column also includes several blocks of optical character recognition alphanumeric characters. These characters and/or the block background in color-coded. The characters and background of these blocks also identifies unique information in regard to the information to be stored in the media, the media, the label itself or the site in which the media is to be stored.

The lower cell of the second vertical column includes a single block having a string of alphanumeric characters. The background is color-coded to correlate to the latter two characters of the string. This information is provided to identify the storage site of the media.

The upper cell of the second vertical column includes a machine-readable indicia, such as a bar code. The information in the machine-readable indicia correlates to all or part of the information of the other three information fields. This allows the information and media to easily tracked.

Thus, a single label can readily provide multiple information fields in several formats as needed. These and other features of the present invention will be evident from the ensuing detailed description of a preferred embodiment and from the drawings.

BRIEF DESCRIPTION OF THE DRAWINGS

FIG. 1 shows a front view of a preferred embodiment of a label of the present invention.

FIG. 2 shows a perspective view of the label of FIG. 1 affixed onto a data storage tape cartridge.

FIG. 3 shows a perspective view of the label of FIG. 1 affixed onto a file folder.

DETAILED DESCRIPTION OF A PREFERRED EMBODIMENT

The present invention provides a unique label format for providing indicia for identifying data storage media. Data includes electronic data for computers, hard copy pages and any other type of information capable of being stored. "Data storage media" is considered for purposes of the present invention to be any physical media in which data may be stored. For instance, data storage media includes computer tape cartridges such as 3480/3490 tape cartridges, four millimeter and eight millimeter tape cartridges, diskettes as well as file folders and notebooks.

One preferred embodiment of the present invention is illustrated in FIGS. 1-3. It is to be expressly understood that this descriptive embodiment is provided for explanatory purposes only. Other embodiments and variations are considered to be within the scope of the inventive concept.

Label 10, shown in FIGS. 1-3, includes four information fields unique to the media on which it is to be attached. Label 10 includes a base material, such as a laminated paper stock having an adhesive back. This allows the label to be easily affixed on a desired media surface, such as shown in FIGS. 2 and 3. Label 10 is divided into two separate vertical columns 12, 14. Vertical column 12 includes two separate cells 20, 30 aligned above one another. Vertical column 14 includes two separate cells 40, 50 aligned above one another.

Each of the four cells 20, 30, 40, 50 in columns 12, 14 forms a distinctive information field 22, 32, 42, 52, respectively. Each field 22, 32, 42, 52 is designed to provide unique information concerning the data stored in the media. These fields can be configured as desired by the particular use for which label 10 is intended. Each field 22, 32, 42, 52 can also be provided with a particular style of indicia as desired as well.

Label 10, in this preferred embodiment, includes information field 22 formed of three blocks 222, 224, 226. Alphanumeric characters 228, 230, 232 are formed in blocks 222, 224, 226, respectively. These alphanumeric characters are not only in human-readable code, but are in Optical Character Recognition (OCR) format to be readable or scanned by optical scanning equipment. In this preferred embodiment, these characters formed as black on a white background. Additional embodiments could use color characters and/or color background. The information in field 22 can identify unique information pertaining to the data storage media. This can include any desired information such as the style of label or style of media. Also, the information can be utilized to fill out eight digits of information which are incorporated in the bar code segment discussed below.

Information field 32, in this embodiment, also includes three blocks 322, 324, 326. Each block includes an alphanumeric character. In the preferred embodiment, alphanumeric characters 328, 330, 332 identify the particular data stored in the media. Blocks 322, 324, 326 are also color-coded. This color coding can provide further information, or as used in the preferred embodiment, uniquely identifies the alphanumeric character in that particular block. For instance, alphanumeric character "0" in block 322 may have color 334 signifying a particular shade of red assigned to character 328, alphanumeric character "3" may have color 336 signifying a particular shade of blue assigned to character 330, and alphanumeric character "8" may have color 338 signifying a particular shade of tan assigned to character 332. This color-coding scheme readily identifies an out-of-sequence data storage media as well as providing ease of identification for sets of data. Additional embodiments may use color-coding of the numbers or background to provide additional information.

In the above described embodiment, information fields 20, 30 have been discussed as two separate information fields having three blocks each. In other embodiments, these blocks could be combined to form a single information field or these blocks could be separate to form individual, distinct information fields.

Information field 42, in the preferred embodiment, includes machine readable code 44 therein. In this embodiment, machine readable code 44 is a bar code. Other types of machine readable codes and/or bar codes can be used. Bar code 44, in this embodiment, duplicates the information from information fields 20, 30 and/or 50. A scanner can easily pass over bar code 44 to identify and track the particular data storage media. Quiet zones 420, 422 are provided on either side of bar code 42. In the preferred embodiment, bar code 44 includes eight (8) digits of information correlating to the eight digits of information provided in information fields 20, 30 and 50.

Information field 52 includes a single block of information. In this embodiment, information field 52 has a sequential string 54 of alphanumeric characters 540, 542, 544, 546, 548, 550 within the single block. This string of alphanumeric characters provides additional information regarding the data and/or data storage media. For instance, a number of sites may be utilized in large information processing systems. Alphanumeric characters 540, 542, 544 in the preferred embodiment, identifies the general storage site where the data storage media is to be located. Alphanumeric characters 546, 548 may identify a particular site within the general location. In the preferred embodiment, block 52 is also color-coded as indicated by 550. This color-coding uniquely identifies alphanumeric characters 546, 548 for ease of identification. This color-coding could also provide additional information regarding the storage site or the data storage media.

Specifically, label 10 of the preferred embodiment provides information fields 20, 30, 50 combining to provide at least eight (8) digits of human readable and optical character recognition scannable alphanumeric characters. The information contained in these eight (8) digits is also contained in eight (8) digit bar code segment 44. Additionally, the alphanumeric characters in information fields 20, 30, 50 may be color-coded to provide additional ease in identifying the information contained in label 10 or to provide additional information.

Label 10 is formed on a base material (not fully shown) as is well known in the art. Typically the base material includes an adhesive back to allow label 10 to be affixed onto a data storage media. For instance, as shown in FIG. 2, label 10 is mounted on front face 610 of tape cartridge 600. This allows tape cartridge 600 to be easily identified and tracked as well as its location, label-type and data stored therein.

An alternative use for label 10 is illustrated in FIG. 3. Label 10 is affixed to tab portion 710 of file folder 700. The information on label 10 can be easily read from file folder 700. This greatly improves the file management of large filing systems.

Thus, the present invention provides a single label providing multiple information fields. The ability of the label of the present invention to provide multiple information fields greatly increases the efficiency of the information management in large information processing systems. In the preferred embodiment, the label provides information fields for identifying the label-type, the data stored in the data storage media, the site in which the data storage media is to be located and machine-readable characters for tracking the data storage media. It is to be expressly understood that other embodiments and variations are considered to be within the scope of the inventive concept. The preferred embodiment described above is intended for descriptive purposes only and is not meant to limit the claimed invention.

We claim:

1. A label having multiple fields, said label comprising:
   a base material;
   a first vertical column including:
      a first cell having at least one alphanumeric character for identifying a first information field;
      a second cell having at least one alphanumeric character for identifying a second information field; a second vertical column including:
      a first cell having machine readable characters for identifying a third information field; and
      a second cell having at least one alphanumeric character for identifying a fourth information field.

2. The label of claim 1 wherein said first cell of said first vertical column includes:
   a unique color assigned to each unique digit of said at least one alphanumeric character of said first cell of said first vertical column.

3. The label of claim 2 wherein said second cell of said first vertical column includes:
   a unique color assigned to each unique digit of said at least one alphanumeric character of said second cell of said first vertical column.

4. The label of claim 1 wherein said first cell of said first vertical column is substantially vertically aligned with said second cell of said first vertical column.

5. The label of claim 1 wherein said machine readable characters of said first cell of said second vertical column include a bar code segment.

6. The label of claim 5 wherein said bar code segment includes a quiet zone at the ends of said bar code segment.

7. The label of claim 1 wherein said alphanumeric code of said first cell of said first vertical column includes:
   alphanumeric digits for identifying the type of said label.

8. The label of claim 1 wherein said at least one alphanumeric character of said second cell of said first vertical column includes:
   at least one alphanumeric character for uniquely identifying a data file.

9. The label of claim 1 wherein said at least one alphanumeric character of said second cell of said second vertical column includes:
   at least one alphanumeric character for providing information regarding the storage cite for the data storage media.

10. The label of claim 1 wherein said alphanumeric code of said second cell of said first vertical column includes:
    optical character recognition characters for identifying the data storage media.

11. The label of claim 10 wherein said alphanumeric code of said second cell of said first vertical column includes:
    unique color codes for each unique character of said optical character recognition codes.

12. The label of claim wherein said machine readable code in said third cell correlates to said alphanumeric characters in said first cell, said second cell and said fourth cell.

13. A label for attachment on data storage media, said label comprising:
    a first information field;
    at least one alphanumeric character in said first information field for identifying information in regard to said label;
    a second information field;
    at least one alphanumeric character in said second information field for identifying information in regard to data stored in the data storage media;
    a third information field;
    at least one alphanumeric character in said third information field for identifying information in regard to the site in which the data storage media is to be located;
    a fourth information field; and
    machine readable characters in said fourth information field for providing information regarding the data stored in the data storage media.

14. The label of claim 13 wherein said label includes:
    unique color-coding designating a unique alphanumeric character in said first information field.

15. The label of claim 13 wherein said label includes:
    unique color-coding designating a unique alphanumeric character in said second information field.

16. The label of claim 13 wherein said label includes:
    unique color-coding designating a unique alphanumeric character in said third information field.

17. The label of claim 13 wherein said machine readable characters in said fourth information field includes:
    a bar code segment.

18. The label of claim 13 wherein said label includes:
    said first information field and said second information field aligned vertically in a column.

19. The label of claim 13 wherein said label includes:
    said fourth information field and said third information field aligned vertically in a column.

20. The label of claim 13 wherein said information in said fourth information field correlates to said information in said first information field, said second information field and said third information field.

* * * * *